United States Patent [19]

Inokuchi et al.

[11] Patent Number: 5,527,841
[45] Date of Patent: Jun. 18, 1996

[54] COATING COMPOSITION FOR THE SURFACE TREATMENT OF A RUBBER ARTICLE

[75] Inventors: Yoshinori Inokuchi; Satoshi Kuwata, both of Gunma-ken; Toshikatu Kanehara, Aichi-ken, all of Japan

[73] Assignee: Shin-Etsu Chemical Co., Ltd, Tokyo, Japan

[21] Appl. No.: 262,950

[22] Filed: Dec. 23, 1994

[30] Foreign Application Priority Data

Dec. 27, 1993 [JP] Japan ................... 5-332841

[51] Int. Cl.⁶ .................. C08K 3/20; C08L 63/02
[52] U.S. Cl. .................. 523/435; 524/588; 524/869; 525/477; 528/38
[58] Field of Search ............ 524/869, 588; 525/477; 523/435; 528/38

[56] References Cited

U.S. PATENT DOCUMENTS

| | | | |
|---|---|---|---|
| 4,252,933 | 2/1981 | Sumida | 528/33 |
| 4,652,618 | 3/1987 | Sumida . | |
| 5,246,995 | 9/1993 | Murakami et al. . | |
| 5,270,110 | 12/1993 | Murakami et al. . | |

FOREIGN PATENT DOCUMENTS

| | | |
|---|---|---|
| 186839 | 7/1986 | European Pat. Off. . |
| 467406 | 1/1992 | European Pat. Off. . |

Primary Examiner—Melvyn I. Marquis
Assistant Examiner—D. Aylward
Attorney, Agent, or Firm—Millen, White, Zelano & Branigan

[57] ABSTRACT

Disclosed is a silicone-based coating composition in the form of an aqueous dispersion of organopolysiloxanes suitable for the surface treatment of a rubber article to impart the surface with excellent lubricity and abrasion resistance so as to be useful for upgrading, for example, wind shields in automobiles. The coating composition comprises, as the effective ingredients, four organopolysiloxanes each in the form of an aqueous dispersion or solution including (a) an organopolysiloxane having a branched molecular structure consisting of two types of the siloxane units of the general formulas $R^1_2SiO$ and $R^1SiO_{1.5}$, in which $R^1$ is a monovalent hydrocarbon group, (b) a hydrolysis-condensation product of an epoxy group-containing dialkoxy silane compound, (c) a hydrolysis-condensation product of an aminoalkyl group-containing dialkoxy silane compound and (d) cured silicone rubber particles in a specified proportion.

12 Claims, 1 Drawing Sheet

COATING COMPOSITION FOR THE SURFACE TREATMENT OF A RUBBER ARTICLE

BACKGROUND OF THE INVENTION

The present invention relates to a coating composition for the surface treatment of a rubber article or, more particularly, to a coating composition for the surface treatment of a rubber article which can be imparted with improved abrasion resistance and smoothness or lubricity on the surface by the treatment therewith. The invention relates also to a method for the improvement of the abrasion resistance and lubricity of the surface of a rubber article.

Needless to say, the application fields of rubber articles are so wide in the modern industries that some of the industries can no longer exist without rubber articles indispensable in various parts. Automobiles are built with a variety of rubber parts, of which weather strips of a cured rubber are used for waterproof sealing in the doors, windshields, rear windows, trunk room lids and elsewhere. Rubber-made weather strips in automobiles are used sometimes with rubbing on the surface or in contact with other parts in a sliding movement so that weather strips are required to have good abrasion resistance of the surface and good lubricity on the surface in order to decrease the friction thereon. One of the methods to meet this requirement is to coat the surface of the rubber article with a urethane resin-based coating composition disclosed in, for example, Japanese Patent Kokai No. 3-20376, No. 3-21675, No. 3-21676, No. 3-86774, No. 3-252477, No. 4-8778, No. 4-8779, No. 4-5580, No. 4-25581, No. 4-31474 and elsewhere or a silicone resin-based coating composition disclosed in Japanese Patent Kokai No. 4-90369, Japanese Patent Publications No. 56-47864 and No. 4-0072 and elsewhere.

The above mentioned urethane resin-based coating compositions are, however, not practically satisfactory for the purpose due to the relatively poor weatherability of the coating film formed therefrom so that the improvement in the surface properties of the rubber articles coated therewith is not durable enough. Though somewhat superior in the weatherability as compared with urethane resin-based coating compositions, the silicone resin-based coating compositions are also not quite satisfactory in respects of the adhesion of the coating film to the rubber surface and the abrasion resistance of the coating film. In addition, the surface lubricity of the rubber articles such as weather strips coated with a silicone resin-based coating composition is not so high that, when the weather strips are used in automobiles, creaking noises are sometimes generated from running automobiles due to the frictional sliding movement on the surface of the weather strips to decrease the pleasantness and safety of the drivers and passengers therein. Moreover, another important problem must be taken into consideration relative to the environmental pollution and workers' health and safety in automobile factories because the above described coating compositions are all in the form of a solution prepared using a large volume of organic solvents as a diluent which is dissipated into the atmospheric air in the step of drying of the coated surface to cause pollution of the working environment.

SUMMARY OF THE INVENTION

The present invention accordingly has an object to provide a novel and improved silicone-based coating composition suitable for the surface treatment of a rubber article with an object to improve the abrasion resistance and lubricity of the surface of the rubber articles without the problems and disadvantages in the above described conventional urethane resin- or silicone resin-based coating compositions in the prior art. Another object is to provide a method for the improvement of the abrasion resistance and lubricity of the surface of a rubber article by using the above mentioned coating composition.

Thus, the silicone-based coating composition of the present invention for the surface treatment of a rubber article is a water-base blend which comprises, as a uniform mixture:

(a) an aqueous dispersion of a non-flowable organopolysiloxane having a branched molecular structure consisting of the organosiloxane units represented by the general formulae $R^1{}_2SiO$ and $R^1SiO_{1.5}$, in which $R^1$ is a monovalent hydrocarbon group having 1 to 20 carbon atoms, as a first organopolysiloxane ingredient;

(b) an aqueous dispersion of a hydrolysis-condensation product of an epoxy group-containing alkoxy silane compound represented by the general formula $R^2R^3Si(OR^4)_2$, in which $R^2$ is a monovalent organic group substituted with an epoxy group and having 5 to 20 carbon atoms and $R^3$ and $R^4$ are each a monovalent hydrocarbon group having 1 to 6 carbon atoms, as a second organopolysiloxane ingredient;

(c) a hydrolysis-condensation product of an amino-group containing alkoxy silane compound represented by the general formula $R^5R^6N(CH_2)_a[NR^7(CH_2)_b]_c\text{-}SiR^8(OR^9)_2$, in which $R^5$, $R^6$ and $R^7$ are each a hydrogen atom or a monovalent hydrocarbon group having 1 to 6 carbon atoms, $R^8$ and $R^9$ are each a monovalent hydrocarbon group having 1 to 6 carbon atoms, the subscripts a and b are each a positive integer not exceeding 6 and the subscript c is zero or a positive integer not exceeding 3, as a third organopolysiloxane ingredient; and (d) an aqueous dispersion of particles of a cured silicone rubber as a fourth organopolysiloxane ingredient, the component (c) being uniformly dispersed in the blend of the components (a), (b) and (d).

The blending proportion of the components (a), (b), (c) and (d) is preferably such that the amount of the first organopolysiloxane in the component (a) is in the range from 10 to 90% by weight, the amount of the second organopolysiloxane in the component (b) is in the range from 1 to 50% by weight, the amount of the third organopolysiloxane as the component (c) is in the range from 1 to 50% by weight and the amount of the fourth organopolysiloxane in the component (d) is in the range from 1 to 70% by weight each based on the total amount of the first to fourth organopolysiloxane ingredients.

BRIEF DESCRIPTION OF THE DRAWING

The Figures are for the illustration of the testing assembly for the evaluation of the surface properties of a rubber article coated with the inventive coating composition, of which

DETAILED DESCRIPTION OF THE PREFERRED EMBODIMENTS

As is described above, the coating composition of the present invention for the surface treatment of a rubber article is a uniform mixture of four different organopolysiloxanes as the essential ingredients of the components (a) to (d) each dispersed in an aqueous medium. A rubber article is coated with this aqueous coating composition followed by drying and curing of the coating film to be imparted with excellent abrasion resistance and lubricity. The thus formed coating film on the rubber surface exhibits good adhesion to the rubber surface and is highly durable against weathering and abrasion and the problems caused by the use of organic solvents can be completely solved with the inventive coating composition because the inventive coating composition consisting of the components (a) to (d) is in the form of an aqueous dispersion of the organopolysiloxanes containing no organic solvents therein.

The component (a) constituting the inventive coating composition is an aqueous dispersion or emulsion of a first organopolysiloxane which is non-flowable with a gel-like consistency or viscosity of at least $10^6$ centistokes at 25° C. and has a branched molecular structure. The organopolysiloxane consists of two different types of organosiloxane units represented by the general formulae $$R^1_2SiO, \qquad (1)$$

and $$R^1SiO_{1.5}, \qquad (2)$$

in which $R^1$ is a monovalent hydrocarbon group having 1 to 20 carbon atoms exemplified by alkyl groups such as methyl, ethyl, propyl, butyl, pentyl, hexyl, heptyl, octyl, nonyl, dodecyl, tetradecyl, hexadecyl and octadecyl groups, alkenyl groups such as vinyl and allyl groups, aryl groups such as phenyl and tolyl groups and cycloalkyl groups such a cyclohexyl group as well as those substituted hydrocarbon groups obtained by replacing a part or all of the hydrogen atoms in the above named hydrocarbon groups with substituents such as halogen atoms and organic groups having an epoxy group, carboxyl group, amino group and the like.

The aqueous dispersion of the above described first organopolysiloxane having a branched molecular structure can be prepared by the method of emulsion polymerization of two kinds of starting materials from which the above mentioned siloxane units of the general formulae (1) and (2) can be derived. The starting material to provide the organosiloxane units of the general formula (1) includes cyclic organopolysiloxane oligomers represented by the general formula $[R^1_2SiO]_A$, in which $R^1$ has the same meaning as defined above and the subscript A is an integer of 3 to 7, and linear diorganopolysiloxanes represented by the general formula $R^{10}O-[-R^1_2Si-O-]_B-R^{10}$, in which $R^1$ has the same meaning as defined above, $R^{10}$ is a hydrogen atom or an unsubstituted or substituted monovalent hydrocarbon group having 1 to 6 carbon atoms exemplified by alkyl groups such as methyl, ethyl, propyl, butyl and hexyl groups, cycloalkyl groups such as cyclopentyl and cyclohexyl groups, phenyl group and halogen-substituted hydrocarbon groups such as 3,3,3-trifluoropropyl group, of which methyl and ethyl groups are particularly preferable, and the subscript B is a positive integer not exceeding 1000. The starting material to provide the organosiloxane units of the general formula (2) is a trialkoxy silane represented by the general formula $R^1Si(OR^{10})_3$, in which $R^1$ and $R^{10}$ each have the same meaning as defined above. The emulsion polymerization of these starting materials is performed by dispersing and emulsifying these reactants together in an aqueous medium containing a surface active agent and a catalyst so that the siloxane rearrangement reaction and hydrolysis-condensation reaction of the reactants proceed to give the first organopolysiloxane as the effective ingredient of the component (a) followed by deactivation of the catalyst after completion of the emulsion polymerization.

The surface active agent to serve as the emulsifying agent in the above mentioned emulsion polymerization is not particularly limited and may include cationic surface active agents such as quaternary ammonium salts and alkylamine salts, amphoteric surface active agents such as alkyl betaines, non-ionic surface active agents such as polyoxyethylene alkyl ethers, polyoxyethylene alkylphenyl ethers, sorbitan fatty acid esters and glycerin fatty acid esters and acidic anionic surface active agents such as organic sulfonic acids and alkylsulfuric acid esters. These surface active agents can be used either singly or as a combination of two kinds or more according to need, if compatible.

When the surface active agent used for emulsification is cationic, amphoteric or non-ionic, suitable catalytic compounds to promote the polymerization reaction include basic compounds such as potassium hydroxide, sodium hydroxide, lithium hydroxide, sodium methylate, ammonia, tetramethyl ammonium hydroxide, triethyl amine and triethanol amine while the acidic anionic surface active agents such as organic sulfonic acids and alkylsulfuric acid esters also exhibit catalytic activity by themselves so that no separate catalyst is required when such a surface active agent is used.

The deactivation treatment of the catalyst after completion of the polymerization reaction is performed by the admixture of the polymerization mixture with a neutralizing agent which can be an acid such as acetic acid, phosphoric acid, hydrochloric acid and citric acid when the catalyst is a basic compound and a basic compound such as potassium hydroxide, sodium hydroxide, lithium hydroxide, sodium methylate, ammonia, tetramethyl ammonium hydroxide, triethyl amine and triethanol amine when an acidic surface active agent is used to serve as the catalyst.

The content of the first organopolysiloxane as the effective ingredient in the aqueous dispersion as the component (a) is, though not particularly limited, in the range from 1 to 70% by weight or, preferably, from 10 to 60% by weight because, when the content thereof is too low, an excessively large amount of the component (a) must be compounded in the inventive coating composition causing an economical disadvantage and inconvenience in handling due to an unduly low overall concentration of the composition while, when the content thereof is too high, difficulties are encountered in handling of the aqueous dispersion due to the undue increase in the viscosity or consistency of the aqueous dispersion.

The second organopolysiloxane as the effective ingredient in the aqueous dispersion as the component (b) in the inventive coating composition is a hydrolysis-condensation product of an epoxy group-containing alkoxy silane compound represented by the general formula $$R^2R^3Si(OR^4)_2, \qquad (3)$$

in which $R^2$ is an epoxy group-containing organic group or hydrocarbon group having 5 to 20 carbon atoms such as 2-glycidyloxyethyl, 3-glycidyloxypropyl, 2-(3,4-epoxycyclohexyl)ethyl and 3-(3,4-epoxycyclohexyl)propyl groups and $R^3$ and $R^4$ are, each independently from the other, a monovalent hydrocarbon group having 1 to 6 carbon atoms exemplified by alkyl groups such as methyl, ethyl, propyl, butyl and hexyl groups, cycloalkyl groups such as cyclo- pentyl and cyclohexyl groups and the phenyl group as well as those substituted hydrocarbon groups obtained by replacing a part or all of the hydrogen atoms in the above named hydrocarbon groups with halogen atoms such as 3,3,3-trifluoropropyl group, of which methyl and ethyl groups are particularly preferable.

Examples of the epoxy group-containing alkoxy silane compound of the above given general formula (3) include 2-glycidyloxyethyl methyl dimethoxy silane, 2-glycidyloxyethyl methyl diethoxy silane, 3-glycidyloxypropyl methyl dimethoxy silane, 3-glycidyloxypropyl methyl diethoxy silane, 2-(3,4-epoxycyclohexyl)ethyl methyl diethoxy silane and 3-(3,4-epoxycyclohexyl)propyl methyl dimethoxy silane as the typical ones. The hydrolysis reaction of these alkoxy silane compounds can be performed by the addition of water and an acid as a catalyst to the alkoxy silane compound so that the dealcoholation condensation reaction following the hydrolysis reaction readily proceeds to give the desired organopolysiloxane after neutralization of the acid catalyst and removal of the alcohol as the condensation product by distillation.

The thus obtained organopolysiloxane as the hydrolysis-condensation product of the epoxy group-containing alkoxy silane compound can be dispersed and emulsified in an aqueous medium containing a surface active agent to give an aqueous dispersion or emulsion of the organopolysiloxane. The surface active agent used for the above mentioned emulsification is, though not particularly limited, preferably a non-ionic surface active agent such as polyoxyethylene alkyl ethers, polyoxyethylene phenyl ethers, sorbitan fatty acid esters, glycerin fatty acid esters and the like. These non-ionic surface active agents can be used either singly or as a combination of two kinds or more according to need.

The content of the organopolysiloxane in the aqueous dispersion as the component (b) of the inventive coating composition is, though not particularly limited, in the range from 1 to 70% by weight or, preferably, from 10 to 50% by weight because, when the content thereof is too low, an excessively large amount of the component (b) must be compounded in the preparation of the inventive coating composition causing an economical disadvantage and inconvenience in handling due to an unduly low overall concentration of the composition while, when the content thereof is too high, difficulties are encountered in handling of the aqueous dispersion due to the undue increase in the viscosity of the aqueous dispersion.

The component (c) constituting the inventive aqueous dispersion of organopolysiloxanes is a third organopolysiloxane which is a hydrolysis-condensation reaction product of an aminoalkyl group-containing dialkoxy silane compound represented by the general formula $$R^5R^6N(CH_2)_a[NR^7(CH_2)_b]_c\text{-SiR}^8(OR^9)_2. \qquad (4)$$

In the formula (4), $R^5$, $R^6$ and $R^7$ are each a hydrogen atom or an unsubstituted or halogen-substituted monovalent hydrocarbon group having 1 to 6 carbon atoms exemplified by alkyl groups such as methyl, ethyl, propyl, butyl and hexyl groups, cycloalkyl groups such as cyclopentyl and cyclohexyl groups, a phenyl group and halogen-substituted alkyl groups such as 3,3,3-trifluoropropyl group. It is preferable that at least 90% by moles of the groups denoted by these symbols are hydrogen atoms, the balance, if any, being the hydrocarbon groups. $R^8$ and $R^9$ are each an unsubstituted or halogen-substituted monovalent hydrocarbon group having 1 to 6 carbon atoms exemplified by those groups given as the examples of $R^5$, $R^6$ and $R^7$ or, preferably, methyl or ethyl group. The subscripts a and b are each a positive integer not exceeding 6 or, preferably, 2 or 3 and the subscript c is 0, 1, 2 or 3. When a is 0, the alkoxy silane of the general formula (4) has an N—N linkage and, when b is 0, an Si—N linkage is formed while these linkages are unstable against hydrolysis so that the desired hydrolysis-condensation product cannot be obtained. On the other hand, the upper limit 3 of the subscript c is given by the difficulties encountered in the synthetic preparation of an alkoxy silane compound having a longer substituent group.

In the preparation of the inventive coating composition, the third organopolysiloxane as the component (c) separately prepared can be dissolved or dispersed in the blend of the other components (a), (b) and (d) but it is preferable that the third organopolysiloxane is prepared in the form of an aqueous solution or dispersion which is mixed together with the components (a), (b) and (d) each in the form of an aqueous dispersion.

Examples of the aminoalkyl group-containing dialkoxy silane compound represented by the general formula (4) include 3-(N-2-aminoethyl)aminopropyl methyl dimethoxy silane, 3-(N-2-aminoethyl)aminopropyl methyl diethoxy silane, 3-aminopropyl methyl dimethoxy silane, 3-aminopropyl methyl diethoxy silane and the like as typical ones.

The hydrolysis reaction of these dialkoxy silane compounds can be performed according to a known procedure by the admixture of water thereto so that the dealcoholation condensation readily proceeds to be followed by the removal of the alcohol as the condensation product by distillation. The thus formed hydrolysis-condensation product of the aminoalkyl group-containing dialkoxy silane compound can be readily dissolved or dispersed in water to give a uniform aqueous dispersion thereof. The content of the hydrolysis-condensation product as the effective ingredient in the aqueous dispersion is in the range from 1 to 50% by weight or, preferably, from 10 to 30% by weight. When the content of the effective ingredient is too low, the adhesion of the coating film of the coating composition on the surface of a rubber article is poor, thus, not ensuring good abrasion resistance of the coating film. When the content of the effective ingredient is too high, the aqueous dispersion of the hydrolysis-condensation product would be poorly compatible with the other essential components of the inventive coating composition, thus, not giving a uniform coating composition. When improvement in the uniformity of the aqueous dispersion as the component (c) is desired, the aqueous dispersion is optionally admixed with an organic acid such as formic, acetic, propionic, malonic, maleic and salicylic acids or an inorganic acid such as hydrochloric, phosphoric and sulfuric acids.

The component (d) constituting the inventive coating composition is an aqueous dispersion of fine particles of a cured silicone rubber of which the average particle diameter is in the range from 0.1 to 100 μm or, preferably, from 1 to 20 μm. When the average particle diameter of the cured silicone rubber particles is too small, the rubber article coated on the surface with the coating composition prepared by using such too fine silicone rubber particles cannot be imparted with good lubricity resulting in little improvement in the sliding behavior of the rubber article. When the average particle diameter of the cured silicone rubber particles is too large, on the other hand, the coating film on the surface of a rubber article has no sufficient abrasion resistance. An aqueous dispersion of such silicone rubber particles suitable as the component (d) can be prepared by dispersing silicone rubber particles separately prepared beforehand in an aqueous medium containing a surface active agent under agitation. It is preferable, however, that the aqueous dispersion of cured silicone rubber particles is prepared by first dispersing a liquid silicone composition curable into a cured silicone rubber in an aqueous medium containing a surface active agent into fine droplets followed by the in situ curing reaction of the curable silicone composition to give fine particles of a cured silicone rubber as the dispersed phase in the aqueous dispersion.

The mechanism of the above mentioned in situ curing reaction in the droplets of a curable silicone composition is not particularly limited and may include the hydrosilation reaction, condensation reaction and ultraviolet-induced addition reaction. The type of the curable silicone compound is also not particularly limited relative to the kind of the organic groups bonded to the silicon atoms, molecular structure, molecular weight and the like provided that the silicone composition can be converted by curing into a solid having rubbery elasticity.

When the curable silicone composition is that curable by the mechanism of the hydrosilation reaction, the composition comprises an organopolysiloxane having, in a molecule, at least two alkenyl, e.g., vinyl, groups bonded to the silicon atoms and an organohydrogenpolysiloxane having, in a molecule, at least two hydrogen atoms directly bonded to the silicon atoms as dispersed and emulsified together with a catalytic amount of a platinum compound in an aqueous medium containing a surface active agent.

In the above mentioned alkenyl group-containing organopolysiloxane, the alkenyl groups can be bonded to the silicon atoms at any positions of the organopolysiloxane molecule but, preferably, should be bonded to the silicon atoms at the molecular chain terminals. The molecular structure of the alkenyl group-containing organopolysiloxane is not particularly limitative and can be straightly linear, branched or cyclic. Mixtures of organopolysiloxanes having different molecular structures can also be used.

Besides the alkenyl groups, the alkenyl group-containing organopolysiloxane has various kinds of organic groups or hydrocarbon groups bonded to the silicon atoms which can be alkyl groups such as methyl, ethyl, propyl, butyl, hexyl and dodecyl groups, aryl groups such as a phenyl group, aralkyl groups such as 2-phenylethyl and 2-phenylpropyl groups and halogen-substituted alkyl groups such as chloromethyl and 3,3,3-trifluoropropyl groups. It is preferable that at least 90% by moles of the organic groups bonded to the silicon atoms are methyl groups in respect of the relatively simple synthetic procedure thereof and good properties of the cured coating film formed from the inventive coating composition.

The average molecular weight of the alkenyl group-containing organopolysiloxane is not particularly limited but the viscosity thereof as a property correlated to the molecular weight should be in the range from 1 to 10000 centistokes or, preferably, from 5 to 1000 centistokes at 25° C. When the viscosity thereof is too low, curing of the organopolysiloxane can hardly proceed by the hydrosilation reaction with the silicon-bonded hydrogen atoms in the organohydrogenpolysiloxane while, when the viscosity thereof is too high, the lubricity of the surface of the rubber article coated with the coating composition is decreased.

The alkenyl group-containing organopolysiloxane having a straightly linear molecular structure assuming that the alkenyl group is a vinyl group denoted by Vi and the rest of the organic groups are methyl groups denoted by Me is expressed by the structural formula $$Vi_dMe_eSi-O-(-SiMe_2-O-)_f-(-SiMeVi-O-)_g-SiMe_eVi_d,$$

in which the subscripts d and e are each 0, 1, 2 or 3 with the proviso that d+e=3, the subscript f is a positive integer and the subscript g is 0 or a positive integer with the proviso that 2d+g is at least 2.

The alkenyl group-containing organopolysiloxane having a cyclic molecular structure assuming that the alkenyl group is a vinyl group and the rest of the organic groups are methyl groups is expressed by the structural formula which the subscript h is a positive integer of 2 or larger and the subscript l is 0 or a positive integer with the proviso that h+l is in the range from 4 to 8.

The alkenyl group-containing organopolysiloxane having a branched molecular structure assuming that the alkenyl group is a vinyl group and the rest of the organic groups are methyl groups is expressed by the unit formula $$(Vi_jMe_kSiO_{0.5})_L(Me_3SiO_{0.5})_m(SiO_2)_n,$$

in which the subscript j is 1, 2 or 3, the subscript k is 0, 1 or 2 with the proviso that j+k=3 and the subscripts L, m and n are each a positive number.

The organohydrogenpolysiloxane serves as a crosslinking agent of the above described alkenyl group-containing organopolysiloxane by the hydrosilation reaction between the silicon-bonded alkenyl, e.g., vinyl, groups and the silicon-bonded hydrogen atoms in the presence of a platinum catalyst. The organic groups bonded to the silicon atoms in the organohydrogenpolysiloxane can be selected from the unsubstituted and substituted monovalent hydrocarbon groups given as the examples of the organic groups in the alkenyl group-containing organopolysiloxane excepting the alkenyl groups but they are preferably methyl groups in view of the relatively simple procedure for the synthesis and good properties of the coating film formed with the coating composition of the invention.

The molecular structure of the organohydrogenpolysiloxane is not particularly limited and can be straightly linear, branched or cyclic. The average molecular weight thereof is also not particularly limitated but it is preferable that the organohydrogenpolysiloxane has a viscosity in the range from 1 to 10000 centistokes at 25° C. in order to ensure good miscibility with the alkenyl group-containing organopolysiloxane.

The amount of the organohydrogenpolysiloxane to be reacted with the alkenyl group-containing organopolysiloxane should be such that from 0.5 to 20 moles or, preferably, from 0.8 to 5 moles of the silicon-bonded hydrogen atoms in the organohydrogenpolysiloxane are provided per mole of the alkenyl groups in the alkenyl group-containing organopolysiloxane. When the amount of the silicon-bonded hydrogen atoms is too small, full curing of the mixture can hardly be obtained as a matter of course while, when the amount of the silicon-bonded hydrogen atoms is too large, a substantial amount of the silicon-bonded hydrogen atoms are left unreacted after the curing reaction so as to adversely affect the properties of the cured silicone rubber.

The organohydrogenpolysiloxane having a straightly linear molecular structure assuming that the organic groups are methyl groups denoted by Me is expressed by the structural formula $$H_pMe_qSi-O-(-SiMe_2-O-)_r-(-SiMeH-O-)_s-SiMe_qH_p,$$

in which the subscript p is 0 or 1, the subscript q is 2 or 3 with the proviso that p+q=3, the subscript r is 0 or a positive integer and the subscript s is a positive integer with the proviso that 2p+s is at least 2.

The organohydrogenpolysiloxane having a cyclic molecular structure assuming that the organic groups are methyl groups is expressed by the structural formula in which the subscript t is a positive integer of 2 or larger and the subscript u is 0 or a positive integer with the proviso that t+u is in the range from 4 to 8.

The organohydrogenpolysiloxane having a branched molecular structure assuming that the organic groups are methyl groups is expressed by the unit formula in which the subscript v is 1, 2 or 3, the subscript w is 0, 1 or 2 with the proviso that v+w=3 and the subscripts x, y and z are each a positive number.

The platinum compound to serve as a catalyst for the hydrosilation reaction is well known in the art and can be any of conventional ones including chloroplatinic acid, complexes of platinum with an olefin, alcohol or phosphorus compound and coordination compound of platinum. The amount of the platinum catalyst added to the reaction mixture is in the range from 1 to 100 ppm by weight calculated as platinum based on the total amount of the alkenyl group-containing organopolysiloxane and the organohydrogenpolysiloxane. When the amount of the platinum catalyst is too small, the velocity of the curing reaction is unduly low as a matter of course in addition to the risk of increased susceptibility of the catalyst to catalyst poisons while no particular additional advantages are obtained by increasing the amount of the platinum catalyst to exceed the above mentioned upper limit rather with an economical disadvantage due to the expensiveness of the platinum compound.

The surface active agent to serve as an emulsifying agent of the organopolysiloxane mixture in an aqueous medium for the preparation of the component (d) is preferably a non-ionic surface active agent such as polyoxyethylene alkyl ethers, polyoxyethylene alkylphenyl ethers, polyoxyethylene sorbitan fatty acid esters and glycerin fatty acid esters because these surface active agents have little adverse influences on the curing reaction of the organopolysiloxanes. These surface active agents can be used either singly or as a combination of two kinds or more according to need.

The content of the cured silicone rubber particles in the aqueous dispersion as the component (d) of the inventive coating composition is in the range from 1 to 70% by weight or, preferably, from 10 to 60% by weight. When the content of the rubber particles is too low, an economical disadvantage is caused in the preparation of the inventive coating composition because the amount of the component (d) must be increased so much while, when the content thereof is too high, the consistency of the aqueous dispersion as the component (d) is too high causing inconvenience in handling. It is optional that the aqueous dispersion of the curable organopolysiloxane mixture is admixed with silicone oils, organosilane compounds, organic and inorganic fillers and the like so that the resultant silicone rubber particles may contain these optional additives.

The organopolysiloxane-based coating composition of the present invention can be prepared by blending the above described aqueous dispersions as the components (a) to (d) in a specified proportion. Thus, the components (a), (b), (c) and (d) are blended together into a uniform aqueous dispersion of the organopolysiloxanes in such a proportion that the relative amounts [component (a)]:[component (b)]:[component (c)]:[component (d)] calculated for the respective organopolysiloxane ingredients is (10–90%):(1–50%):(1–50%):(1–70%) by weight or, preferably, (20–70%):(5–20%):(5–20%):(5–50%) by weight based on the total amount of the four organopolysiloxane ingredients.

The blending work of the components (a) to (d) can be performed by using a conventional mixing machine of any type. The total content of the organopolysiloxane ingredients in the thus prepared coating composition of the invention is in the range from 1 to 50% by weight or, preferably, from 10 to 30% by weight. When the content thereof is too low, the coating film formed on the surface of a rubber article by applying the coating composition thereto and drying hardly has a sufficient thickness so that the abrasion resistance of the coating film is decreased while, when the content is too high, the stability of the coating composition as an aqueous dispersion of the organopolysiloxane ingredients is decreased. When the content of the organopolysiloxane ingredients is too high in the composition as prepared, it is optional that the composition is diluted by the addition of a suitable volume of water so that the content is adjusted to be within the above mentioned range.

It is optional that the coating composition of the invention is admixed with various kinds of additives according to need each in a limited amount. For example, curing of the coating film on the surface of a rubber article can be accelerated by the admixture of the coating composition with a known curing accelerator which can be a metal salt of an organic acid such as dibutyl tin dilaurate, dioctyl tin laurate, dibutyl tin diacetate, tin octoate, iron octoate, zinc octoate and the like. Other optional additives include carbon black, powders of a synthetic resin such as fluorocarbon resins, melamine resins, acrylic resins, polycarbonate resins, silicone resins and nylon resins, graphite powder, organic and inorganic pigments, paraffin waxes, polyethylene waxes, silicone oils and so on.

As is mentioned before, the coating composition of the present invention is suitable for the surface treatment of rubber articles of which the rubber can be any of natural and synthetic rubbers including, for example, natural rubber, EPDM rubbers, SBR rubbers, polychloroprene rubbers, isoprene-isobutylene copolymeric rubbers, nitrile rubbers and the like without particular limitations. Shaped articles of a foamed or spongy rubber are also suitable for the surface treatment with the inventive coating composition.

In practicing the method for the surface treatment of a rubber article by using the above described coating composition, the rubber article is coated with the coating composition by a suitable known method such as brush coating, spray coating, roller coating knife coating, dip coating and the like followed by drying at room temperature or at an elevated temperature to effect curing of the coating film so that a surface-treated rubber article having excellent abrasion resistance and lubricity on the surface is obtained. The thickness of the coating film on the surface of the rubber article formed from the inventive coating composition is in the range from 0.1 to 10 μm or, preferably, from 0.5 to 5 μm as dried and cured. Thus, the coating composition of the present invention is useful for upgrading of various rubber articles including weather strips in automobiles, sealing materials such as O-rings, gaskets, packings and the like, rubber hoses and so on.

In the following, examples are given to illustrate in more detail the organopolysiloxane-based coating composition of the invention as well as the application thereof to the surface treatment of a rubber article. The term of "parts" in the following examples and comparative examples always refers to "parts by weight". The examples are preceded by their description of the preparation procedures of the respective components (a) to (d) used in the examples. The rubber articles surface-treated with the inventive coating composition prepared in the examples were evaluated for the abrasion resistance and surface lubricity by the testing procedures described below.

Evaluation of Abrasion Resistance

Figure 1:
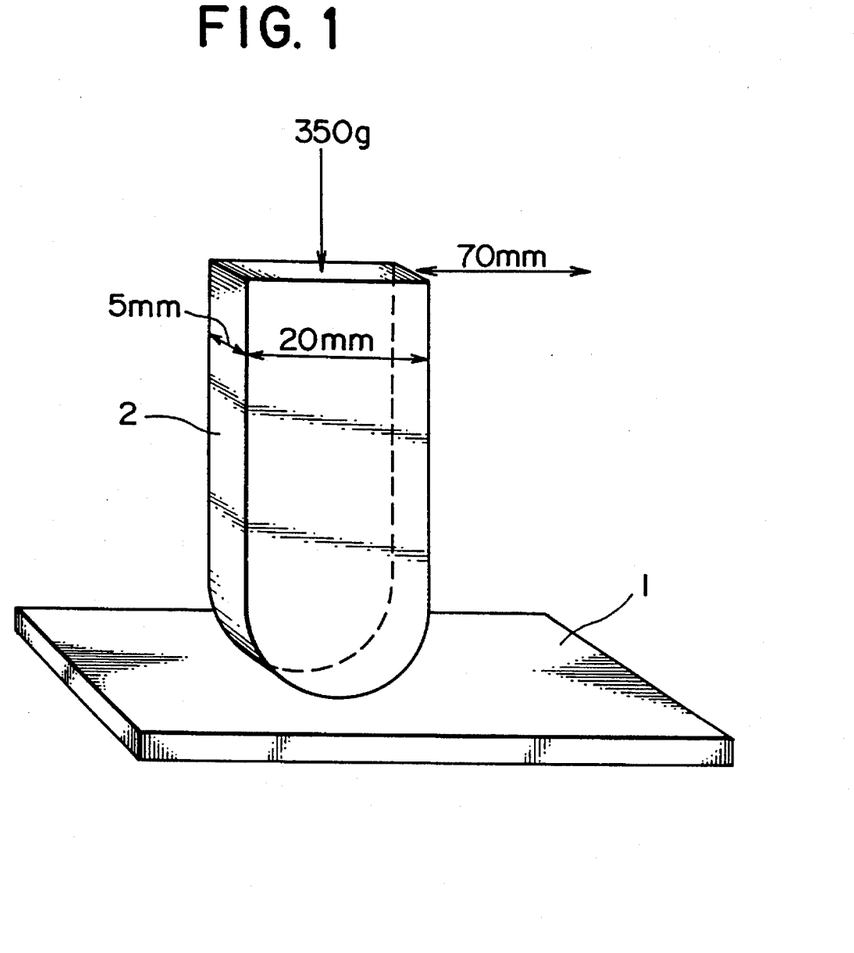
FIG. 1 is a perspective view of the testing assembly for the abrasion resistance and FIG. 2 is a perspective view of the test specimen for the measurement of the coefficient of kinematic friction.

As is illustrated in FIG. 1, a spongy EPDM rubber strip 1 of 10 mm width, 150 mm length and 2 mm thickness having a JIS A hardness of 36 and a specific gravity of 0.63 after the surface treatment was rubbed with a rubbing thruster 2 of a glass plate of 5 mm thickness with the contacting surface roughened by using a sand paper, which was pressed against the rubber strip under a thrust load of 350 g and moved back and forth at a rubbing stroke of 70 mm and a frequency of 60 reciprocations per minute to record the number of the rubbing movements until the coating layer on the surface of the rubber sheet was removed.

Evaluation of Surface Lubricity

Figure 2:
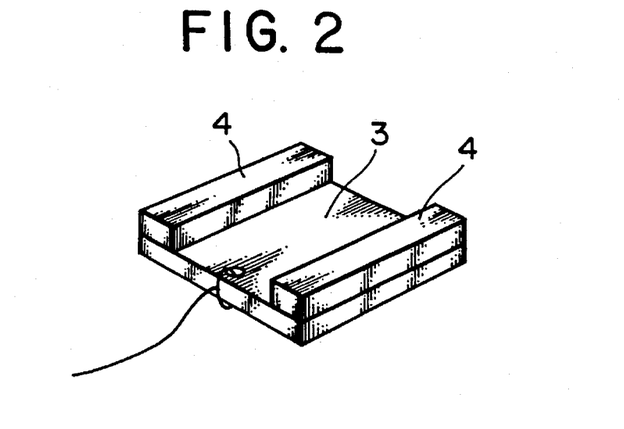

Two sponge rubber pieces 4 of the same spongy rubber as used above each having dimensions of 10 mm width, 50 mm length and 2 mm thickness after the surface treatment were adhesively bonded to a copper plate 3 of 50 mm by 50 mm square and 0.25 mm thickness as is illustrated in FIG. 2 to prepare a test specimen which was slided on a glass plate under a load of 1 kg by pulling at a velocity of 100 mm per minute to determine the coefficient of kinematic friction.

Preparation of Aqueous Dispersion A-1 as the Component (a).

A mixture of 350 g of octamethyl cyclotetrasiloxane and 1.3 g of phenyl triethoxy silane was agitated in a 1 liter glass beaker by using a homomixer at 2000 rpm and the mixture was admixed with 35 g of a 10% aqueous solution of sodium lauryl sulfate and 35 g of a 10% aqueous solution of dodecylbenzene sulfonic acid under further continued agitation at 6000 rpm to cause an increase in the viscosity due to phase inversion from the W/O-type to an O/W-type emulsion. The mixture was admixed with 280 g of water under further continued agitation at 2000 rpm followed by homogenization by passing through a high-pressure homogenizer at a pressure of 300 kg/cm$^2$ to give a stable O/W-type aqueous emulsion.

The aqueous emulsion was transferred into a glass flask of 1 liter capacity equipped with a stirrer, thermometer and reflux condenser and heated therein at 50° C. for 12 hours to effect the polymerization reaction. After aging at 25° C. for 24 hours to complete the reaction, the reaction mixture was neutralized by the addition of a 10% aqueous solution of sodium carbonate to give a stable aqueous emulsion of an organopolysiloxane having a branched molecular structure, which is referred to as the component A-1 hereinafter.

A small portion of the component A-1 was admixed with isopropyl alcohol to destroy the emulsion and isolate the water-insoluble ingredient which was a gel-like non-flowable organopolysiloxane. The content of the organopolysiloxane ingredient in the component A-1 was 49% by weight.

Preparation of Aqueous Dispersion A-2 as the Component (a)

A mixture of 333 g of octamethyl cyclotetrasiloxane, 14 g of N-(2-aminoethyl)-3-aminopropyl methyl polysiloxane and 3 g of methyl triethoxy silane was agitated in a 1 liter glass beaker by using a homomixer at 2000 rpm and the mixture was admixed with 30 g of a 30% aqueous solution of cetyl trimethyl ammonium chloride, 3 g of a polyoxyethylene (60 moles addition) nonylphenyl ether and 70 g of water under further continued agitation at 6000 rpm to cause an increase in the viscosity due to phase inversion. The mixture was admixed with 520 g of water under further continued agitation at 2000 rpm followed by homogenization by passing through a high-pressure homogenizer at a pressure of 300-kg/cm$^2$ to give a stable O/W-type aqueous emulsion.

The aqueous emulsion was admixed with 20 g of a 5% aqueous solution of potassium hydroxide and transferred into a glass flask of 1 liter capacity equipped with a stirrer, thermometer and reflux condenser and heated therein at 70° C. for 72 hours to effect the polymerization reaction. After aging at 25° C. for 24 hours to complete the reaction, the reaction mixture was neutralized by the addition of acetic acid to give a stable aqueous emulsion of an organopolysiloxane having a branched molecular structure, which is referred to as the component A-2 hereinafter.

A small portion of the component A-2 was admixed with isopropyl alcohol to destroy the emulsion and isolate the water-insoluble ingredient which was a gel-like non-flowable organopolysiloxane after drying. The content of the organopolysiloxane ingredient in the component A-2 was 35% by weight.

Preparation of Aqueous Dispersion B as the Component (b)

A mixture consisting of 2 g of 35% hydrochloric acid and 190 g of deionized water was taken in a glass flask of 1 liter capacity equipped with a stirrer, dropping funnel, thermometer and reflux condenser and 270 g of 3-glycidyloxypropyl methyl diethoxy silane were added dropwise to the hydrochloric acid solution in the flask at 50° C. under agitation over a period of 3 hours to be hydrolyzed. After completion of the dropwise addition of the silane compound, the reaction mixture was neutralized with propylene oxide and the mixture was heated up to 100° C. under reduced pressure to remove the ethyl alcohol as the hydrolysis product taking 30 minutes at 100° C. followed by cooling to room temperature to give a hydrolysis-condensation product of the silane compound.

A 315 g portion of the above obtained hydrolysis-condensation product was introduced into a glass beaker of 1 liter capacity together with 30 g of a polyoxyethylene (85 moles addition) nonylphenyl ether and 70 g of water and the mixture was agitated with a homomixer at 6000 rpm to indicate an increase in the viscosity. Thereafter, the mixture was admixed with 285 g of water under further continued agitation at 2000 rpm and homogenized by passing through a high-pressure homogenizer at a pressure of 300 kg/cm$^2$ to give a stable aqueous emulsion of an organopolysiloxane, which is referred to as the component B hereinafter. The content of the organopolysiloxane as the effective ingredient in the component B was 45.0% by weight.

Preparation of Aqueous Solution C-1 as the Component (c)

Into a glass flask of 1 liter capacity equipped with a stirrer, dropping funnel, thermometer and reflux condenser contain- ing 500 g of 3-(N-2-aminoethyl)aminopropyl methyl dimethoxy silane, 135 g of deionized water were added dropwise at room temperature under agitation over a period of 30 minutes to effect hydrolysis of the silane compound. After completion of the dropwise addition of deionized water, the mixture in the flask was heated and kept at 55° to 60° C. for 30 minutes under reduced pressure so as to remove the methyl alcohol as the hydrolysis product by distillation followed by cooling to room temperature to terminate the reaction. A 105 g portion of the thus obtained hydrolysis-condensation product was added to 595 g of water in a glass flask of 1 liter capacity and agitated for 30 minutes at room temperature to give a stable aqueous solution of an organopolysiloxane, which is referred to as the component C-1 hereinafter. The concentration of the organopolysiloxane as the effective ingredient in the component C-1 was 15.0% by weight.

Preparation of Aqueous Solution C-2 as the Component (c)

Into a glass flask of 1 liter capacity equipped with a stirrer, dropping funnel, thermometer and reflux condenser containing 500 g of 3-aminopropyl methyl dimethoxy silane, 170 g of deionized water were added dropwise at room temperature under agitation over a period of 30 minutes to effect hydrolysis of the silane compound. After completion of the dropwise addition of deionized water, the mixture in the flask was heated and kept at 55° to 60° C. for 30 minutes under reduced pressure so as to remove the methyl alcohol as the hydrolysis product by distillation followed by cooling to room temperature to terminate the reaction. A 105 g portion of the thus obtained hydrolysis-condensation product was added to 595 g of water in a glass flask of 1 liter capacity and agitated for 30 minutes at room temperature to give a stable aqueous solution of an organopolysiloxane, which is referred to as the component C-2 hereinafter. The concentration of the organopolysiloxane as the effective ingredient in the component C-2 was 15.0% by weight.

Preparation of Aqueous Dispersion D-1 as the Component (d)

A mixture consisting of 280 g of a methyl vinyl polysiloxane having a viscosity of 10 centistokes at 25° C. and expressed by the formula ViMe$_2$Si—O—(—SiMe$_2$—O—)$_{10}$—SiMe$_2$Vi, in which Vi and Me each have the same meaning as defined above, and 90 g of a methylhydrogenpolysiloxane having a viscosity of 200 centistokes at 25° C. and expressed by the formula Me$_3$Si—O—(—SiMeH—O—)$_{50}$—(—SiMe$_2$—O—)$_{50}$—SiMe$_3$, was agitated in a glass beaker of 1 liter capacity by using a homomixer working at 2000 rpm and admixed with a polyoxyethylene (9 moles addition) octylphenyl ether and 70 g of water followed by continued agitation at 6000 rpm to indicate an increase in the viscosity due to phase inversion. Thereafter, the mixture was admixed with 295 g of water and agitation was continued at 2000 rpm to give an O/W-type aqueous emulsion.

The above obtained aqueous emulsion was transferred into a glass flask equipped with a stirrer and admixed with a mixture of 1 g of a toluene solution of a chloroplatinic acid-olefin complex in a concentration of 0.05% by weight as platinum and 1 g of polyoxyethylene (9 moles addition) octylphenyl ether at room temperature under continued agitation for 12 hours to effect the hydrosilation reaction so that an aqueous dispersion of cured silicone rubber particles, which is referred to as the component D-1 hereinafter, was obtained. The average particle diameter of the silicone rubber particles in the composition D-1 was determined by using a particle size analyzer (Coulter Counter, manufactured by Coulter Electronics Co.) to find a value of 4 μm. A small portion of the component D-1 was taken and dried at room temperature to give a white rubber powder having elasticity. The content of the silicone rubber particles as the effective organopolysiloxane ingredient in the component D-1 was 50% by weight.

Preparation of Aqueous Dispersion D-2 as the Component (d)

The procedure for the preparation of another aqueous dispersion of cured silicone rubber particles, referred to as the component D-2 hereinafter, was substantially the same as in the preparation of the component D-1 described above except that the amount of the polyoxyethylene octylphenyl ether used in the preparation of the O/W-type aqueous emulsion was 0.5 g instead of 3 g. The average particle diameter of the cured silicone rubber particles contained in the component D-2 was 13 μm and a white rubber powder having elasticity was obtained by air-drying the component D-2. The content of the silicone rubber particles in the component D-2 was 50% by weight.

EXAMPLE 1

A coating composition was prepared by uniformly blending:

22.9 parts of the component A-1 as the component (a);
3.6 parts of the component B as the component (b);
21.3 parts of the component C-1 as the component (c);
8.0 parts of the component D-1 as the component (d); and
44.2 parts of water.

The blending proportion of the components (a) to (d) calculated as the respective organopolysiloxane ingredients therein, i.e. (a):(b):(c):(d), was 56:8:16:20 by weight.

A 2 mm thick test piece of spongy EPDM rubber as specified in the description of the testing procedures was coated with the above prepared coating composition by brushing in a coating thickness of 1 to 3 μm as dried and the coating layer was dried and cured by heating at 150° C. for 10 minutes in a hot-air circulation oven to give a surface-treated test specimen of which the evaluation tests were undertaken according to the testing procedures described before to give the results shown in Table 1 to follow.

EXAMPLE 2

The experimental procedure was substantially the same as in Example 1 except that the coating composition was prepared by blending:

26.1 parts of the component A-1 as the component (a);
2.2 parts of the component B as the component (b);
14.7 parts of the component C-1 as the component (c);
8.0 parts of the component D-1 as the component (d); and 49.0 parts of water, so that the blending proportion of the components (a) to (d) calculated as the respective organopolysiloxane ingredients therein, i.e. (a):(b):(c):(d), was 64:5:11:20 by weight.

The results of the evaluation tests are shown in Table 1.

EXAMPLE 3

The experimental procedure was substantially the same as in Example 1 except that the coating composition was prepared by blending:

- 18.8 parts of the component A-1 as the component (a);
- 3.6 parts of the component B as the component (b);
- 21.3 parts of the component C-1 as the component (c);
- 12.0 parts of the component D-1 as the component (d); and
- 44.3 parts of water, so that the blending proportion of the components (a) to (d) calculated as the respective organopolysiloxane ingredients therein, i.e. (a):(b):(c):(d), was 46:8:15:30 by weight.

The results of the evaluation tests are shown in Table 1.

EXAMPLE 4

The experimental procedure was substantially the same as in Example 1 except that the coating composition was prepared by blending:

- 10.6 parts of the component A-1 as the component (a);
- 3.6 parts of the component B as the component (b);
- 21.3 parts of the component C-1 as the component (c);
- 20.0 parts of the component D-1 as the component (d); and
- 44.5 parts of water, so that the blending proportion of the components (a) to (d) calculated as the respective organopolysiloxane ingredients therein, i.e. (a):(b):(c):(d), was 26:8:16:50 by weight.

The results of the evaluation tests are shown in Table 1.

EXAMPLE 5

The experimental procedure was substantially the same as in Example 1 except that the coating composition was prepared by blending:

- 32.0 parts of the component A-2 as the component (a);
- 3.6 parts of the component B as the component (b);
- 21.3 parts of the component C-1 as the component (c);
- 8.0 parts of the component D-1 as the component (d); and
- 35.1 parts of water, so that the blending proportion of the components (a) to (d) calculated as the respective organopolysiloxane ingredients therein, i.e. (a):(b):(c):(d), was 56:8:16:20 by weight.

The results of the evaluation tests are shown in Table 1.

EXAMPLE 6

The experimental procedure was substantially the same as in Example 1 except that the coating composition was prepared by blending:

- 22.9 parts of the component A-1 as the component (a);
- 3.6 parts of the component B as the component (b);
- 21.3 parts of the component C-2 as the component (c);
- 8.0 parts of the component D-1 as the component (d); and
- 44.2 parts of water, so that the blending proportion of the components (a) to (d) calculated as the respective organopolysiloxane ingredients therein, i.e. (a):(b):(c):(d), was 56:8:16:20 by weight.

The results of the evaluation tests are shown in Table 1.

EXAMPLE 7

The experimental procedure was substantially the same as in Example 1 except that the coating composition was prepared by blending:

- 22.9 parts of the component A-1 as the component (a);
- 3.6 parts of the component B as the component (b);
- 21.3 parts of the component C-1 as the component (c);
- 8.0 parts of the component D-2 as the component (d); and
- 44.2 parts of water, so that the blending proportion of the components (a) to (d) calculated as the respective organopolysiloxane ingredients therein, i.e. (a):(b):(c):(d), was 56:8:16:20 by weight.

The results of the evaluation tests are shown in Table 1.

COMPARATIVE EXAMPLE 1

The experimental procedure was substantially the same as in Example 1 except that the coating composition was prepared by blending:

- 28.6 parts of the component A-1 as the component (a);
- 4.4 parts of the component B as the component (b);
- 26.7 parts of the component C-1 as the component (c); and
- 40.3 parts of water, with omission of the component (d) so that the blending proportion of the components (a) to (d) calculated as the respective organopolysiloxane ingredients therein, i.e. (a):(b):(c):(d), was 70:10:20:0 by weight.

The results of the evaluation tests are shown in Table 1.

COMPARATIVE EXAMPLE 2

The experimental procedure was substantially the same as in Example 1 except that the coating composition was prepared by blending:

- 4.4 parts of the component B as the component (b);
- 26.7 parts of the component C-1 as the component (c);
- 28.0 parts of the component D-1 as the component (d); and
- 40.9 parts of water, with omission of the component (a) so that the blending proportion of the components (a) to (d) calculated as the respective organopolysiloxane ingredients therein, i.e. (a):(b):(c):(d), was 0:10:20:70 by weight.

The results of the evaluation tests are shown in Table 1.

COMPARATIVE EXAMPLE 3

The experimental procedure was substantially the same as in Example 1 except that the coating composition was prepared by blending:

- 22.9 parts of the component A-1 as the component (a);
- 32.0 parts of the component C-1 as the component (c);
- 8.0 parts of the component D-1 as the component (d); and
- 37.1 parts of water, with omission of the component (b) so that the blending proportion of the components (a) to (d) calculated as the respective organopolysiloxane ingredients therein, i.e. (a):(b):(c):(d), was 56:0:24:20 by weight.

The evaluation tests of the coating-treated rubber specimen could not be undertaken due to the great stickiness even after curing.

COMPARATIVE EXAMPLE 4

The experimental procedure was substantially the same as in Example 1 except that the coating composition was prepared by blending:

22.9 parts of the component A-1 as the component (a);

10.7 parts of the component B as the component (b);

8.0 parts of the component D-1 as the component (d); and 58.4 parts of water, with omission of the component (c) so that the blending proportion of the components (a) to (d) calculated as the respective organopolysiloxane ingredients therein, i.e. (a):(b):(c):(d), was 56:24:0:20 by weight.

The evaluation tests of the coating-treated rubber specimen could not be undertaken due to the great stickiness even after curing.

COMPARATIVE EXAMPLE 5

The experimental procedure was substantially the same as in Example 1 except that the coating composition was prepared by blending:

3.3 parts of the component A-1 as the component (a);

13.8 parts of the component B as the component (b);

41.3 parts of the component C-1 as the component (c);

19.0 parts of the component D-1 as the component (d); and 29.6 parts of water, so that the blending proportion of the components (a) to (d) calculated as the respective organopolysiloxane ingredients therein, i.e. (a):(b):(c):(d), was 8:31:31:30 by weight.

The results of the evaluation tests are shown in Table 1.

COMPARATIVE EXAMPLE 6

The experimental procedure was substantially the same as in Example 1 except that the coating composition was prepared by blending:

37.1 parts of the component A-1 as the component (a);

1.3 parts of the component B as the component (b);

4.0 parts of the component C-1 as the component (c);

1.2 parts of the component D-2 as the component (d); and 56.4 parts of water, so that the blending proportion of the components (a) to (d) calculated as the respective organopolysiloxane ingredients therein, i.e. (a):(b):(c):(d), was 91:3:3:3 by weight.

The results of the evaluation tests are shown in Table 1.

TABLE 1

| | Number of rubbing, times | Coefficient of kinematic friction |
| --- | --- | --- |
| Example 1 | 4000 | 0.6 |
| Example 2 | 4000 | 0.6 |
| Example 3 | 4000 | 0.7 |
| Example 4 | 3000 | 0.8 |
| Example 5 | 4000 | 0.6 |
| Example 6 | 4000 | 0.6 |
| Example 7 | 3000 | 0.5 |
| Comparative Example 1 | 2000 | 1.3 |
| Comparative Example 2 | 2000 | 1.1 |
| Comparative Example 3 | (not tested) | |
| Comparative Example 4 | (not tested) | |
| Comparative Example 5 | 1000 | 1.0 |
| Comparative Example 6 | 500 | 1.3 |

What is claimed is:

1. A silicone-based coating composition for the surface treatment of a rubber article which is a uniform water-base mixture comprising:

(a) an aqueous dispersion of a non-flowable organopolysiloxane having a branched molecular structure consisting essentially of the organosiloxane units represented by the general formulae $R^1_2SiO$ and $R^1SiO_{1.5}$, in which $R^1$ is a monovalent hydrocarbon group having 1 to 20 carbon atoms, as a first organopolysiloxane ingredient;

(b) an aqueous dispersion of a hydrolysis-condensation product of an epoxy group-containing alkoxy silane compound represented by the general formula $R^2_a R^3_b Si(OR^4)_2$, in which $R^2$ is a monovalent organic group substituted by an epoxy group and having 5 to 20 carbon atoms and $R^3$ and $R^4$ are each a monovalent hydrocarbon group having 1 to 6 carbon atoms, as a second organopolysiloxane ingredient;

(c) a hydrolysis-condensation product of an amino-group containing alkoxy silane compound represented by the general formula $R^5R^6N(CH_2)_a[NR^7(CH_2)_b]_c-SiR^8(OR^9)_2$, in which $R^5$, $R^6$ and $R^7$ are each a hydrogen atom or a monovalent hydrocarbon group having 1 to 6 carbon atoms, $R^8$ and $R^9$ are each a monovalent hydrocarbon group having 1 to 6 carbon atoms, the subscripts a and b are each a positive integer not exceeding 6 and the subscript c is zero or a positive integer not exceeding 3, as a third organopolysiloxane ingredient; and (d) an aqueous dispersion of particles of a cured silicone rubber as a fourth organopolysiloxane ingredient, the component (c) being dissolved or dispersed in the blend of the components (a), (b) and (d), in such a blending proportion of the components (a), (b), (c) and (d) that the amount of the first organopolysiloxane in the component (a) is in the range from 10 to 90% by weight, the amount of the second organopolysiloxane in the component (b) is in the range from 1 to 50% by weight, the amount of the third organopolysiloxane as the component (c) is in the range from 1 to 50% by weight and the amount of the fourth organopolysiloxane in the component (d) is in the range from 1 to 70% by weight each based on the total amount of the first to fourth organopolysiloxanes.

2. The silicone-based coating composition for the surface treatment of a rubber article as claimed in claim I in which the blending proportion of the components (a), (b), (c) and (d) is such that the amount of the first organopolysiloxane in the component (a) is in the range from 20 to 70% by weight, the amount of the second organopolysiloxane in the component (b) is in the range from 5 to 20% by weight, the amount of the third organopolysiloxane as the component (c) is in the range from 5 to 20% by weight and the amount of the fourth organopolysiloxane in the component (d) is in the range from 5 to 50% by weight based on the total amount of the first to fourth organopolysiloxanes.

3. The silicone-based Coating composition for the surface treatment of a rubber article as claimed in claim 1 in which the epoxy group-containing alkoxy silane compound is 3-glycidyloxypropyl methyl diethoxy silane.

4. The silicone-based coating composition for the surface treatment of a rubber article as claimed in claim 1 in which the amino group-containing alkoxy silane compound is 3-(N-2-aminoethyl)aminopropyl methyl dimethoxy silane or 3-aminopropyl methyl dimethoxy silane.

5. The silicone-based coating composition for the surface treatment of a rubber article as claimed in claim 1 in which the cured silicone rubber is an alkenyl group-containing organopolysiloxane crosslinked with an organohydrogenpolysiloxane by the hydrosilation reaction in the presence of a platinum compound as a catalyst.

6. A method for the improvement of the abrasion resistance and lubricity of the surface of a rubber article which comprises the steps of:

(A) coating the surface of the rubber article with a silicone-based coating composition which is a uniform water-base mixture comprising:

(a) an aqueous dispersion of a non-flowable organopolysiloxane having a branched molecular structure consisting essentially of the organosiloxane units represented by the general formulas $R^1_2SiO$ and $R^1SiO_{1.5}$, in which $R^1$ is a monovalent hydrocarbon group having 1 to 20 carbon atoms, as a first organopolysiloxane ingredient;

(b) an aqueous dispersion of a hydrolysis-condensation product of an epoxy group-containing alkoxy silane compound represented by the general formula $R^2R^3Si(OR^4)_2$, in which $R^2$ is a monovalent organic group substituted by an epoxy group and having 5 to 20 carbon atoms and $R^3$ and $R^4$ are each a monovalent hydrocarbon group having 1 to 6 carbon atoms, as a second organopolysiloxane ingredient;

(c) a hydrolysis-condensation product of an amino-group containing alkoxy silane compound represented by the general formula $R^5R^6N(CH_2)_a[NR^7(CH_2)_b]_c$—$SiR^8(OR^9)_2$, in which $R^5$, $R^6$ and $R^7$ are each a hydrogen atom or a monovalent hydrocarbon group having 1 to 6 carbon atoms, $R^8$ and $R^9$ are each a monovalent hydrocarbon group having 1 to 6 carbon atoms, the subscripts a and b are each a positive integer not exceeding 6 and the subscript c is zero or a positive integer not exceeding 3, as a third organopolysiloxane ingredient; and (d) an aqueous dispersion of particles of a cured silicone rubber as a fourth organopolysiloxane ingredient, the component (c) being dissolved or dispersed in the blend of the components (a), (b) and (d), in such a blending proportion of the components (a), (b), (c) and (d) that the amount of the first organopolysiloxane in the component (a) is in the range from 10 to 90% by weight, the amount of the second organopolysiloxane in the component (b) is in the range from 1 to 50% by weight, the amount of the third organopolysiloxane as the component (c) is in the range from 1 to 50% by weight and the amount of the fourth organopolysiloxane in the component (d) is in the range from 1 to 70% by weight each based on the total amount of the first to fourth organopolysiloxanes; and (B) drying the coating film on the surface of the rubber article to effect curing of the organopolysiloxane ingredients in the coating composition to form a cured coating layer.

7. The method for the improvement of the abrasion resistance and lubricity of the surface of a rubber article as claimed in claim 6 in which the thickness of the coating layer as dried and cured is in the range from 0.1 to 10 μm.

8. The silicone-based coating composition of claim 1, wherein the first organopolysiloxane ingredient has a viscosity of at least $10^6$ centistokes at 25° C.

9. The silicone-based coating composition of claim 1, wherein, in the first organopolysiloxane, each $R^1$ is, independently, an alkyl group, alkenyl group, phenyl group, tolyl group or cycloalkyl group of 1 to 20 carbon atoms, optionally, substituted with halogen atoms or organic groups containing an epoxy, carboxyl or amino group.

10. The silicone-based coating composition of claim 1, wherein, in the second organopolysiloxane, $R^2$ is 2-glycidyloxyethyl, 3-glycidyloxypropyl, 2-(3,4-epoxycyclohexyl)ethyl or 3-(3,4-epoxycyclohexyl)propyl, and $R^3$ and $R^4$ are, independently, an alkyl group, phenyl group or cycloalkyl group of 1 to 6 carbon atoms, optionally, substituted with halogen atoms.

11. The silicone-based coating composition of claim 1, wherein, in the third organopolysiloxane, $R^5$, $R^6$ and $R^7$ are, independently, a hydrogen atom or an alkyl group, phenyl group or cycloalkyl group of 1 to 6 carbon atoms, optionally, substituted with halogen atoms and $R^8$ and $R^9$ are, independently, an alkyl group, phenyl group or cycloalkyl group of 1 to 6 carbon atoms, optionally, substituted with halogen atoms.

12. The silicone-based coating composition of claim 1, wherein, the particles of cured silicone rubber as the fourth organopolysiloxane ingredient have an average particle diameter of 0.1 to 100 μm.

* * * * *